(12) United States Patent
Mizuno

(10) Patent No.: US 6,380,953 B1
(45) Date of Patent: *Apr. 30, 2002

(54) METHOD OF DISPLAY SCROLLING ALONG A TIMEBASE AND AN APPARATUS FOR PERFORMING THE METHOD

(75) Inventor: Shinya Mizuno, Tokyo (JP)

(73) Assignee: Nippon Steel Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,424

(22) Filed: Oct. 27, 1998

(30) Foreign Application Priority Data

Oct. 28, 1997 (JP) .............................. 9-311346

(51) Int. Cl.$^7$ ................................. G06F 3/14
(52) U.S. Cl. ...................... 345/764; 345/784; 345/963
(58) Field of Search ................................ 345/326, 334, 345/333, 339, 340, 341, 348, 349, 352, 354, 963, 973, 974, 700, 744, 747, 764, 765, 777, 781, 783, 784, 786, 787, 810, 830, 833, 835, 839, 840, 866; 705/8, 9

(56) References Cited

U.S. PATENT DOCUMENTS

| | | | |
|---|---|---|---|
| 5,129,057 A | * 7/1992 | Strope et al. ................. 345/833 |
| 5,247,438 A | * 9/1993 | Subas et al. ................... 700/90 |
| 5,526,018 A | * 6/1996 | Fisher ......................... 345/668 |
| 5,528,745 A | * 6/1996 | King et al. .................... 345/753 |
| 5,659,768 A | * 8/1997 | Forbes et al. ................. 707/517 |
| 5,745,110 A | * 4/1998 | Ertemalp ...................... 345/764 |
| 5,805,444 A | * 9/1998 | Seymour ....................... 700/16 |
| 5,855,006 A | * 12/1998 | Huemoeller et al. ........... 705/9 |
| 5,874,965 A | * 2/1999 | Takai et al. .................. 345/667 |
| 5,877,758 A | * 3/1999 | Seybold ....................... 345/866 |
| 5,877,759 A | * 3/1999 | Bauer ......................... 709/317 |
| 5,877,760 A | * 3/1999 | Onda et al. ................... 345/784 |
| 5,895,451 A | * 4/1999 | Yamade et al. ................ 705/8 |
| 5,899,979 A | * 5/1999 | Miller et al. .................. 705/9 |
| 5,936,625 A | * 8/1999 | Kahl et al. ................... 345/775 |
| 5,970,466 A | * 10/1999 | Detjen et al. ................. 705/8 |
| 5,974,391 A | * 10/1999 | Hongawa ...................... 705/7 |
| 6,018,343 A | * 1/2000 | Wang et al. .................. 345/733 |
| 6,034,683 A | * 3/2000 | Mansour et al. .............. 345/764 |

\* cited by examiner

Primary Examiner—Crescelle N. dela Torre
(74) Attorney, Agent, or Firm—Connolly Bove Lodge & Hutz LLP

(57) ABSTRACT

This invention has a scroll means for displaying GUI operation members consisting of calendar information on the computer screen, and moving the screen display field to a date position containing information corresponding to the date of the operated GUI operation member upon operation of one of the GUI operation members. The user can very easily see the information compared to a conventional scroll bar display, and can quickly observe corresponding information by only operating the GUI operation member of his or her desired date.

24 Claims, 12 Drawing Sheets

FIG. 9

| | JANUARY | FEBRUARY | MARCH | -------- | DECEMBER | |
|---|---|---|---|---|---|---|
| 1ST | | | | | | |
| 2ND | | | | | | |
| 3RD | | | | | | 1997 |
| ⋮ | | | | | | |
| 31ST | | | | | | |
| | | | | | | 1998 |
| | | | | | | 1999 |
| ⋮ | ⋮ | ⋮ | ⋮ | ⋮ | ⋮ | |
| | | | | | | 2010 |

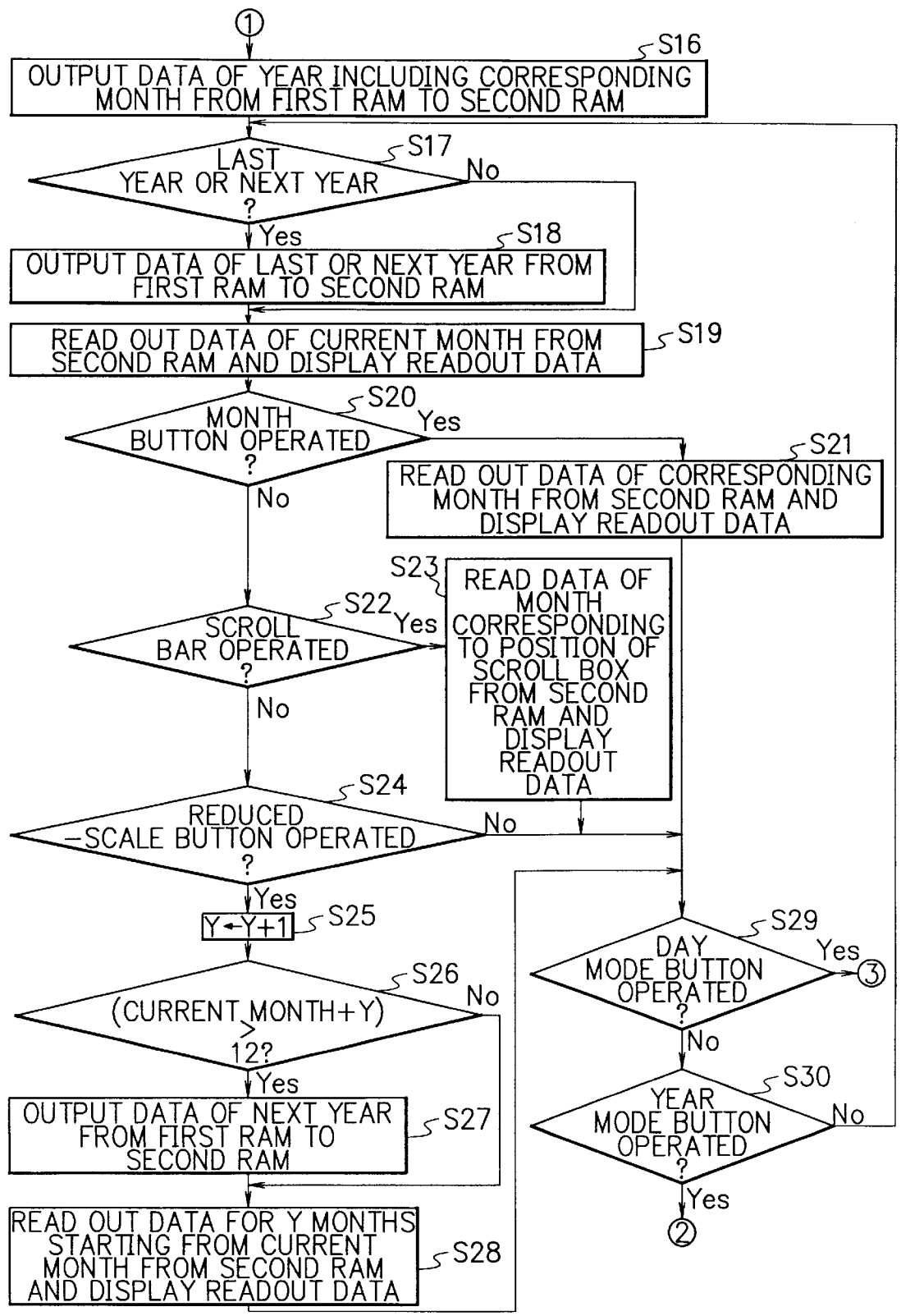

METHOD OF DISPLAY SCROLLING ALONG A TIMEBASE AND AN APPARATUS FOR PERFORMING THE METHOD

BACKGROUND OF THE INVENTION

1. Field of the Invention

The present invention relates to a scroll display method on a time axis, a scroll display control apparatus, and a storage medium and, for example, to a technique for moving the screen display field of information, which is formed along the time axis, along the time axis on a planning chart used in, e.g., scheduling on a computer.

2. Description of the Related Art

Conventionally, various techniques for displaying planning charts used in, e.g., scheduling on the display screen of a computer and controlling schedules on the computer have been proposed. As an example of a planning chart, a bar chart, a so-called Gantt chart, which is used in production planning, control, and the like, and depicts jobs, experiments, or the like planned or done in relation to time, is known.

When such Gantt chart is displayed on the entire computer screen or on a window in the screen, all scheduled items on the time axis cannot often be displayed. In such case, a GUI operation member called a scroll bar is displayed. By operating this scroll bar, information within the screen or window can be scrolled vertically or horizontally.

For example, as shown in FIG. 1, only a schedule for one day is displayed on the display screen, and when a schedule for another day is to be input or checked, the user can move the display field to the right or left by clicking a right or left scroll button 41b or 41a of a scroll bar 41. In this case, upon operation of the left scroll button 41a, a schedule of the previous day is displayed on the screen, and upon operation of the right scroll button 41b, a schedule of the next day is displayed. By dragging a scroll box 41c to the right or left, the display field can be moved.

However, in the conventional technique which uses the aforementioned scroll bar 41 as a means for moving (scrolling) the display field along the time axis in association with information formed along the time axis such as a Gantt chart, scroll operability upon displaying information for a desired day on the screen is very poor.

More specifically, when the right or left scroll button 41b or 41a is used, the screen is scrolled once per clicking, and the scroll speed is low. When the display field is to be moved skipping many days, a long time is required. By holding down the right or left scroll buttons 41b or 41a, the same effect as continuous clicking can be obtained, but such operation is by no means convenient.

By contrast, when the scroll box 41c is used, the display field can be quickly moved to information of a schedule part corresponding to the dropped position of the scroll box 41c on the scroll bar 41. However, in order to display a schedule for a desired day on the screen, the user experiences difficulty in determining the dropping position of the scroll box 41c. As a consequence, the user must gradually move the display field using the right or left scroll button 41b or 41a, or the scroll box 41c to adjust the display position while confirming the screen.

SUMMARY OF THE INVENTION

It is an object of the present invention to improve scroll operability upon displaying information for a desired interval of time when a display field is scrolled along the time axis for information such as a Gantt chart on a computer.

In order to achieve the above object, a scroll display method on a time axis according to the present invention, comprises the steps of: displaying GUI operation members consisting of calendar information on the screen; and moving the screen display field along the time axis to display at least information corresponding to a date indicated by the operated GUI operation member on the screen upon operation of one of the GUI operation members.

Note that the GUI operation members may be displayed on the screen together with information to be displayed on the screen display field.

The GUI operation members may be a plurality of day buttons each of which is assigned to one day, a plurality of month buttons each of which is assigned to one month, or a plurality of year buttons each of which is assigned to one year.

The information displayed on the screen display field may be schedule information for scheduling, the method may have a mode for displaying the schedule information in units of days, a mode for displaying the schedule information in units of months, and a mode for displaying the schedule information in units of years, and the GUI operation members may be switched to a plurality of day buttons each of which is assigned to one day, a plurality of month buttons each of which is assigned to one month, or a plurality of year buttons each of which is assigned to one year in correspondence with one of the modes selected.

In another aspect of the present invention, the information displayed on the screen display field is time information for scheduling, the method has a mode for displaying one unit schedule of the time information, and a mode for simultaneously displaying a plurality of unit schedules, and when the mode for simultaneously displaying the plurality of unit schedules is selected, scrolling is made to move and display a plurality of unit schedules of the time information including a date indicated by the operated GUI operation member within the screen display field.

In still another aspect of the present invention, a GUI operation member consisting of a scroll bar is displayed in the vicinity of the GUI operation members consisting of the calendar information, and when the scroll bar is operated, the screen display field is moved along the time axis to display information of a date corresponding to a position of a scroll box that forms the scroll bar on the screen.

A scroll display control apparatus on the time axis according to the present invention is a scroll display control apparatus for moving a screen display field of information along a time axis, which is displayed on a screen, along the time axis, comprising GUI operation members consisting of calendar information displayed on the screen, and scroll means for moving the screen display field along the time axis to display at least information corresponding to a date indicated by the operated GUI operation member on the screen upon operation of one of the GUI operation members.

The GUI operation members may be a plurality of day buttons each of which is assigned to one day, a plurality of month buttons each of which is assigned to one month, or a plurality of year buttons each of which is assigned to one year.

In another aspect of the present invention, the information displayed on the screen display field is schedule information for scheduling, and the apparatus further comprises mode selection means for selecting one of a mode for displaying the schedule information in units of days, a mode for displaying the schedule information in units of months, and a mode for displaying the schedule information in units of years, and GUI switching means for switching the GUI operation members to a plurality of day buttons each of which is assigned to one day, a plurality of month buttons each of which is assigned to one month, or a plurality of year buttons each of which is assigned to one year in correspondence with one of the modes selected.

In still another aspect of the present invention, the information displayed on the screen display field is time information for scheduling, the apparatus further comprises mode selection means for selecting one of a mode for displaying one unit schedule of the time information, and a mode for simultaneously displaying a plurality of unit schedules, and when the mode for simultaneously displaying the plurality of unit schedules is selected, the scroll means scrolls to move and display a plurality of unit schedules of the time information including a date indicated by the operated GUI operation member within the screen display field.

In still another aspect of the present invention, a scroll button is used together with the day, month, or year buttons.

In still another aspect of the present invention, a GUI operation member consisting of a scroll bar is displayed in the vicinity of the GUI operation members consisting of the calendar information, and when the scroll bar is operated, the scroll means moves the screen display field along the time axis to display information of a date corresponding to a position of a scroll box that forms the scroll bar on the screen.

In still another aspect of the present invention, the apparatus further comprises first storage means for storing schedule information in units of years, months, and days for scheduling, second storage means for storing some pieces of schedule information read out from the first storage means, and read-out control means for, upon switching the modes, controlling to store some pieces of schedule information required for the selected mode from the first storage means to the second storage means, and when one of the GUI operation members is operated, the scroll means reads out information corresponding to a date indicated by the operated GUI operation member from the second storage means and displays the readout information on the screen.

A computer-readable storage medium according to the present invention records a program for making a computer implement a function of displaying GUI operation members consisting of calendar information displayed on a screen which can be scrolled to move a screen display field of information along a time axis, along the time axis, and moving the screen display field along the time axis to display at least information corresponding to a date indicated by the operated GUI operation member on the screen upon operation of one of the GUI operation members.

Note that the GUI operation members may be a plurality of day buttons each of which is assigned to one day, a plurality of month buttons each of which is assigned to one month, or a plurality of year buttons each of which is assigned to one year.

In another aspect of the present invention, the information displayed on the screen display field is schedule information for scheduling, and the medium further records a program for making the computer implement a function, which has mode selection means for selecting one of a mode for displaying the schedule information in units of days, a mode for displaying the schedule information in units of months, and a mode for displaying the schedule information in units of years, and which switches the GUI operation members to a plurality of day buttons each of which is assigned to one day, a plurality of month buttons each of which is assigned to one month, or a plurality of year buttons each of which is assigned to one year in correspondence with one of the modes selected.

In still another aspect of the present invention, the medium further records a program for making the computer implement a function of displaying a GUI operation member consisting of a scroll bar in the vicinity of the GUI operation members consisting of the calendar information, and moving the screen display field along the time axis to display information of a date corresponding to a position of a scroll box that forms the scroll bar on the screen upon operation of the scroll bar.

BRIEF DESCRIPTION OF THE DRAWINGS

FIG. 9 is a schematic view showing a data storage example in a first RAM shown in FIG. 8; and FIGS. 10A to 10C are flow charts showing the operation of the computer shown in FIG. 8.

DETAILED DESCRIPTION OF THE PREFERRED EMBODIMENTS

The preferred embodiment of the present invention will now be described with reference to the accompanying drawings.

Figure 1:
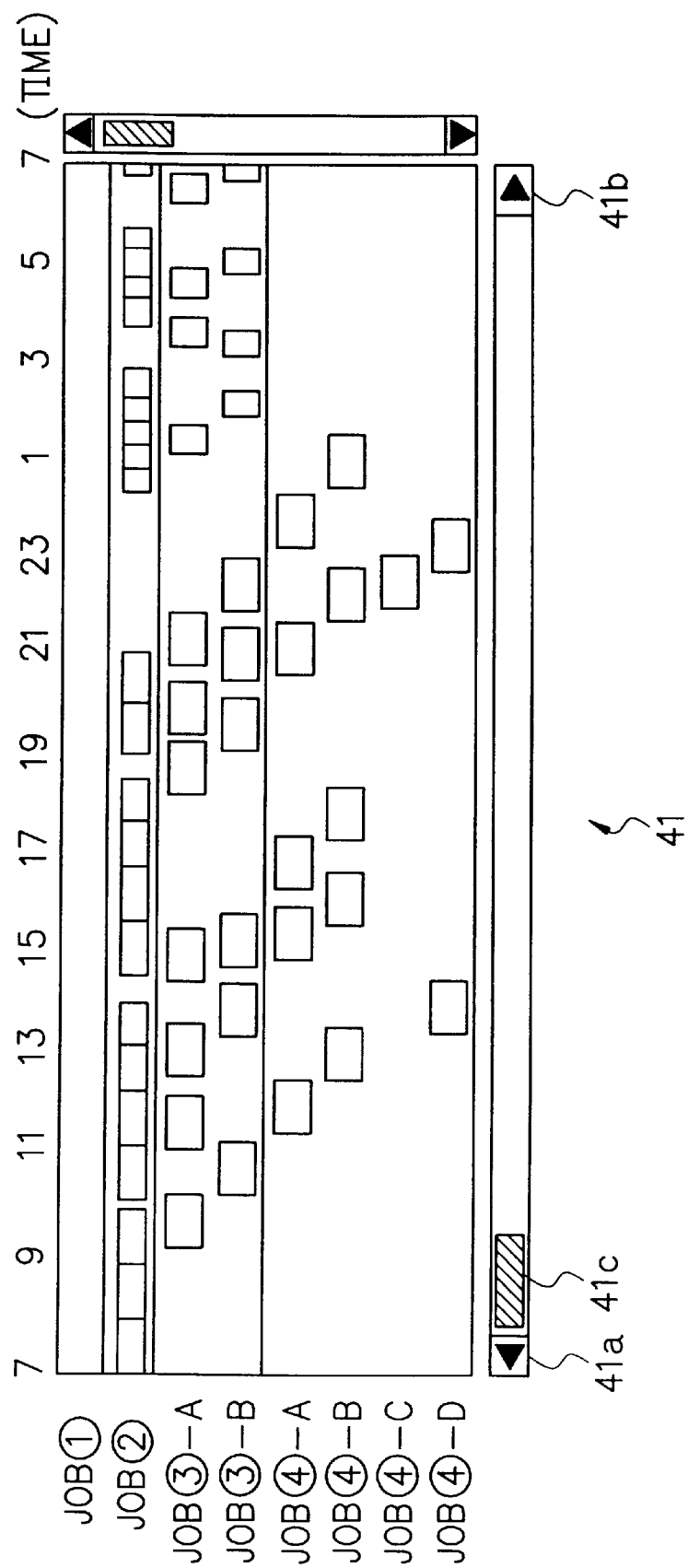
FIG. 1 is a view for explaining a conventional scroll display method.
Figure 2:
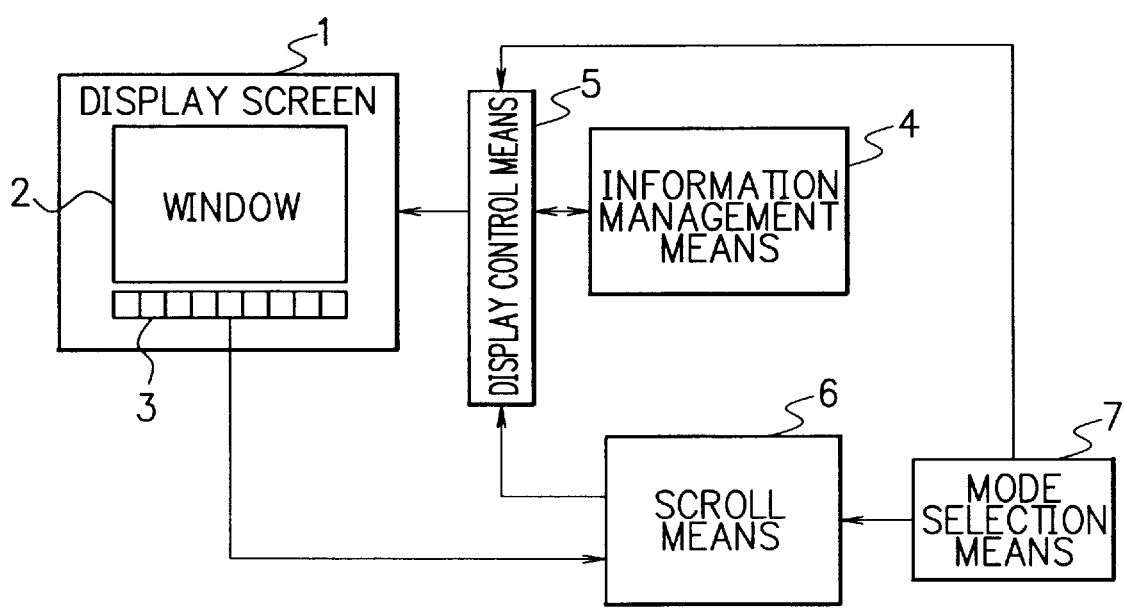
FIG. 2 is a block diagram showing the principal functional arrangement of a computer which comprises a scroll display control apparatus according to the present invention.

FIG. 2 is a block diagram showing the principal functional arrangement of a computer which comprises a scroll display control apparatus according to the present invention.

Referring to FIG. 2, reference numeral 1 denotes a screen of a display apparatus (to be referred to as a display screen hereinafter), within which a window 2 is displayed. Various kinds of information are displayed on this window 2. In this embodiment, information that can be depicted along the time axis, e.g., a planning chart (e.g., a Gantt chart) used in various kinds of scheduling on the computer is displayed.

When such Gantt chart is displayed on the window 2, all pieces of information cannot often be displayed at once within the window. Hence, GUI operation members 3 are displayed together with the window 2. By operating one of the GUI operation members 3, schedule information (screen display field) in the Gantt chart within the window 2 can be scrolled to the right or left along the time axis.

Figure 3:
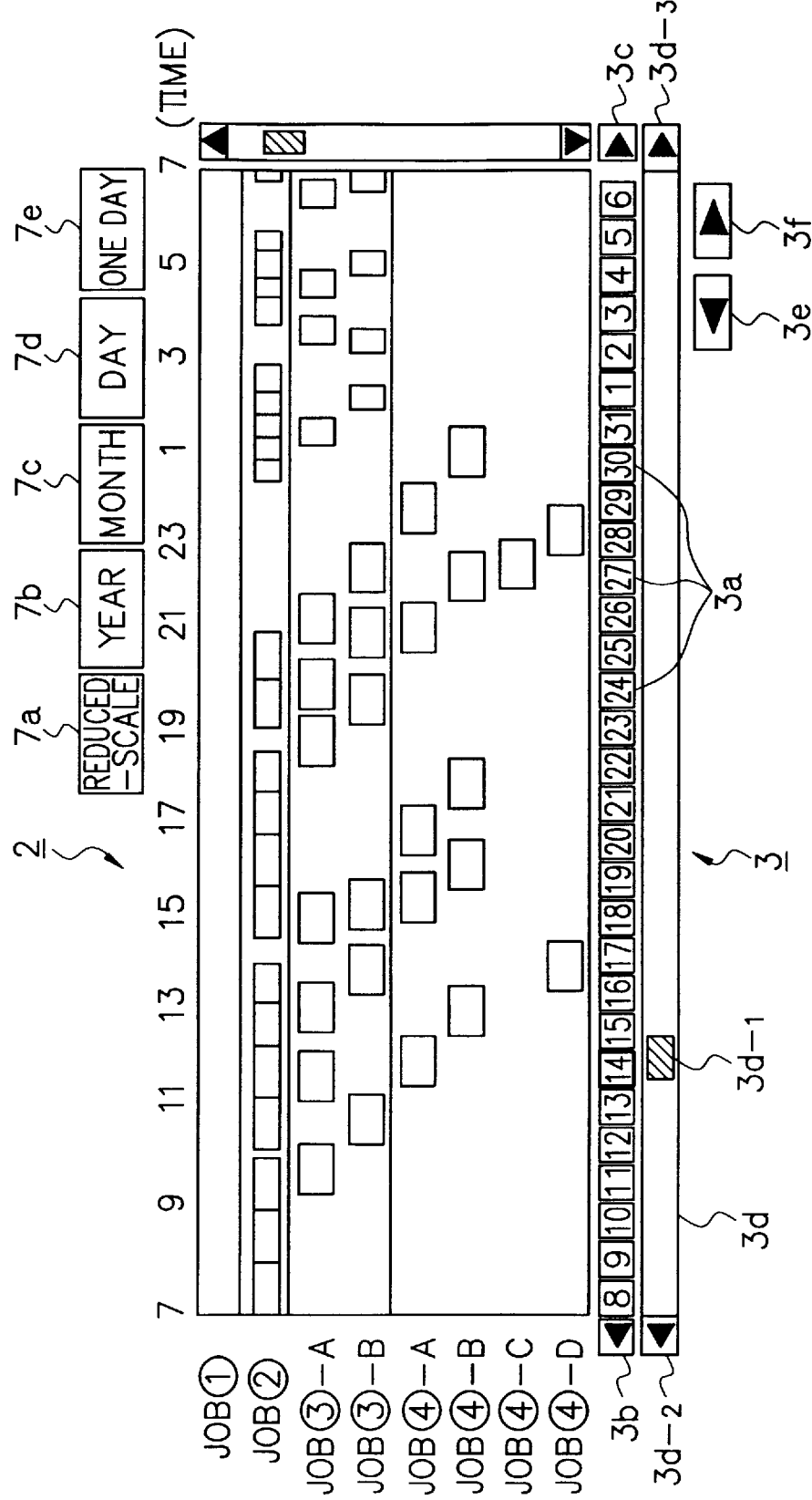
FIG. 3 is a view for explaining a scroll display method on a time axis according to the present invention, and shows a display example on a screen when a day mode and normal mode have been selected.
Figure 4:
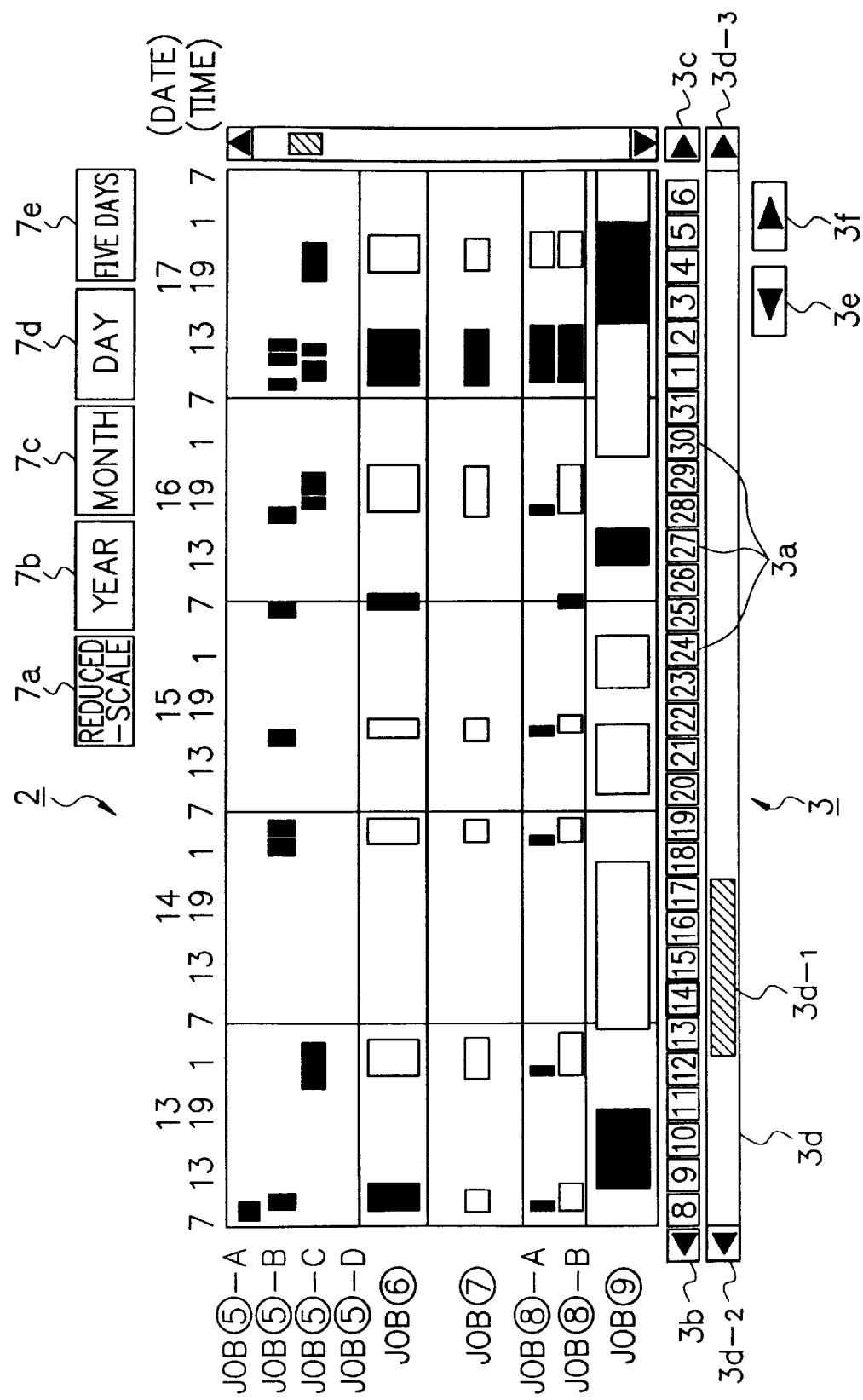
FIG. 4 is a view for explaining a scroll display method on a time axis according to the present invention, and shows a display example on the screen when the day mode and a reduced-scale mode have been selected.

In this embodiment, the GUI operation members 3 include those consisting of calendar information. For example, in a day mode (to be described in detail later), as shown in FIGS. 3 and 4 in detail, the GUI operation members 3 include a plurality of day buttons 3a, right and left scroll buttons 3c and 3b, a scroll bar 3d, and scroll buttons 3e and 3f for switching information to be displayed to a schedule for the last or next month. In this example, the day buttons 3a are displayed for 30 days from the start day to be displayed. The start day to be displayed can be arbitrarily set.

This embodiment has, as a mode upon displaying schedule information of the Gantt chart on the window 2, a day mode for displaying information in units of days, a month mode for displaying information in units of months, and a year mode for displaying information in units of years. Furthermore, the day mode is classified into a normal mode for displaying schedule information for a day, and a reduced-scale mode for displaying information for a plurality of days at the same time. The month and year modes are also classified into the normal and reduced-scale modes. These modes can be selected by a mode selection means 7 shown in FIG. 2.

In the example in FIG. 3, the day mode for displaying schedule information in units of days, and the normal mode for displaying schedule information for a day have been selected. In the example in FIG. 4, the day mode has been selected as in FIG. 3, but the reduced-scale mode for displaying schedule information for a plurality of days (five days in this example) at the same time has been selected in place of the normal mode.

The mode selection means 7 may be implemented by hardware buttons and the like provided to the computer, or GUI operation members displayed on the display screen 1. FIGS. 3 and 4 exemplify a case wherein the mode selection means 7 is implemented by GUI operation members.

More specifically, as a GUI button for selecting one of the normal and reduced-scale modes, a reduced-scale button 7a for displaying schedule information by changing, e.g., the reduction scale on the time axis is provided. By pressing this reduced-scale button 7a, the normal mode and reduced-scale mode are toggled. Also, an arbitrary item may be selected by clicking a mouse button from a popup menu that shows a list of one day/five days/one week, and the like.

As GUI buttons for selecting one of the year, month, and day modes, a year mode button 7b, month mode button 7c, and day mode button 7d are provided. Of these three buttons, a mode corresponding to the pressed button is set. Note that the year, month, and day modes may be toggled every time one button is pressed, like the reduced-scale button 7a.

The contents of the mode selected by these buttons 7a to 7d are displayed as a guide 7e. In the example in FIG. 3, "one day" is displayed there, i.e., it indicates that the day mode and normal mode have been selected. On the other hand, in the example in FIG. 4, "five days" is displayed there, i.e., it indicates that the day mode and reduced-scale mode have been selected.

FIGS. 3 and 4 show display examples in the day mode, as described above. Display examples in the month and year modes are respectively shown in FIGS. 5 and 6 (both these examples are in the normal mode). Although not shown in FIGS. 5 and 6, a bar schedule chart is displayed on the window 2 in practice like in FIGS. 3 and 4.

Figure 5:
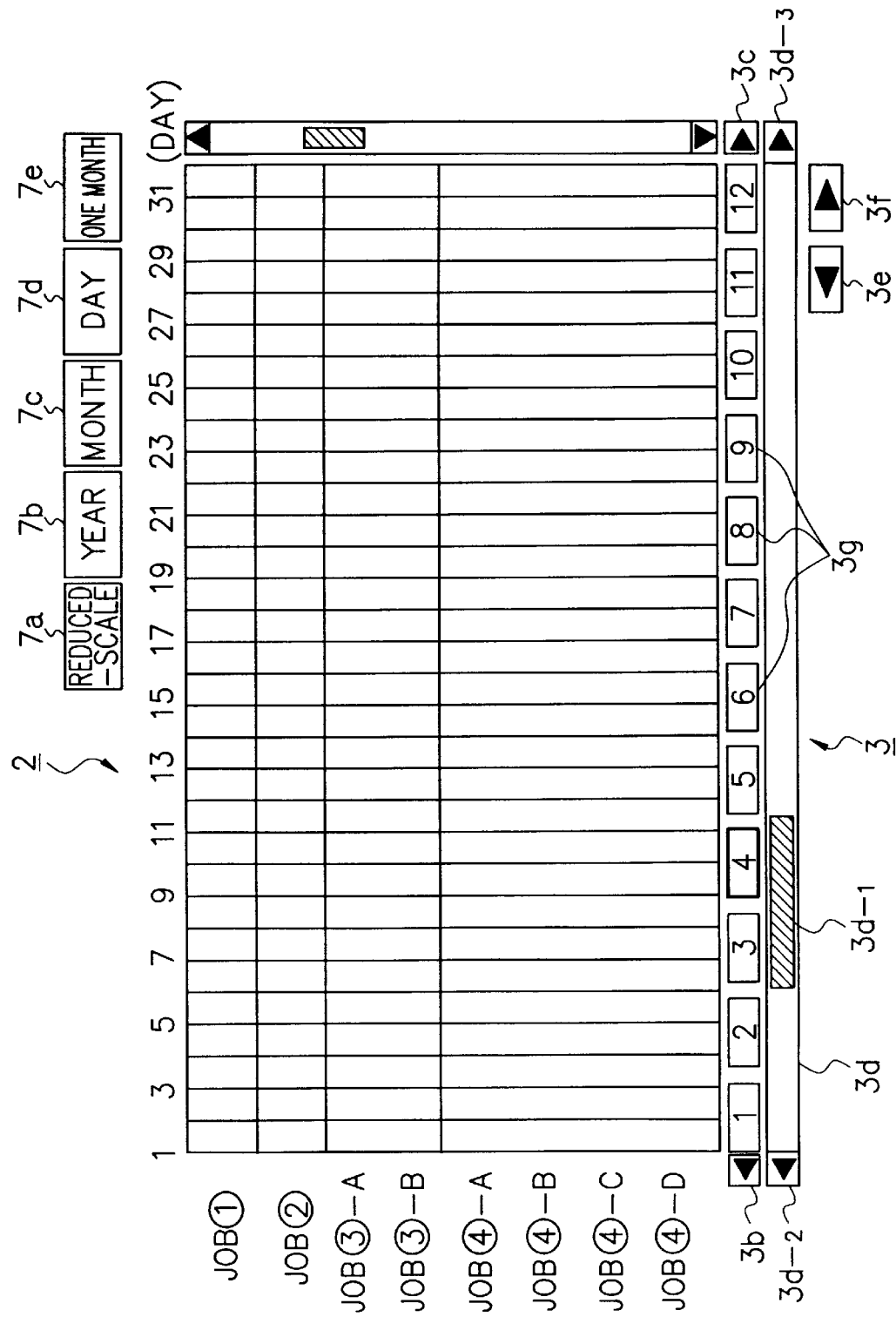
FIG. 5 is a view for explaining a scroll display method on a time axis according to the present invention, and shows a display example on the screen when a month mode and the normal mode have been selected.

In FIG. 5 that shows the display example in the month mode, a plurality of month buttons 3g to each of which one operation member is assigned per month are displayed in place of the day buttons 3a displayed in the day mode. On the other hand, the scroll buttons 3e and 3f displayed in the day mode serve as scroll buttons for switching the schedule to the one for the last or next year. Other GUI buttons are the same as those in FIGS. 3 and 4.

Figure 6:
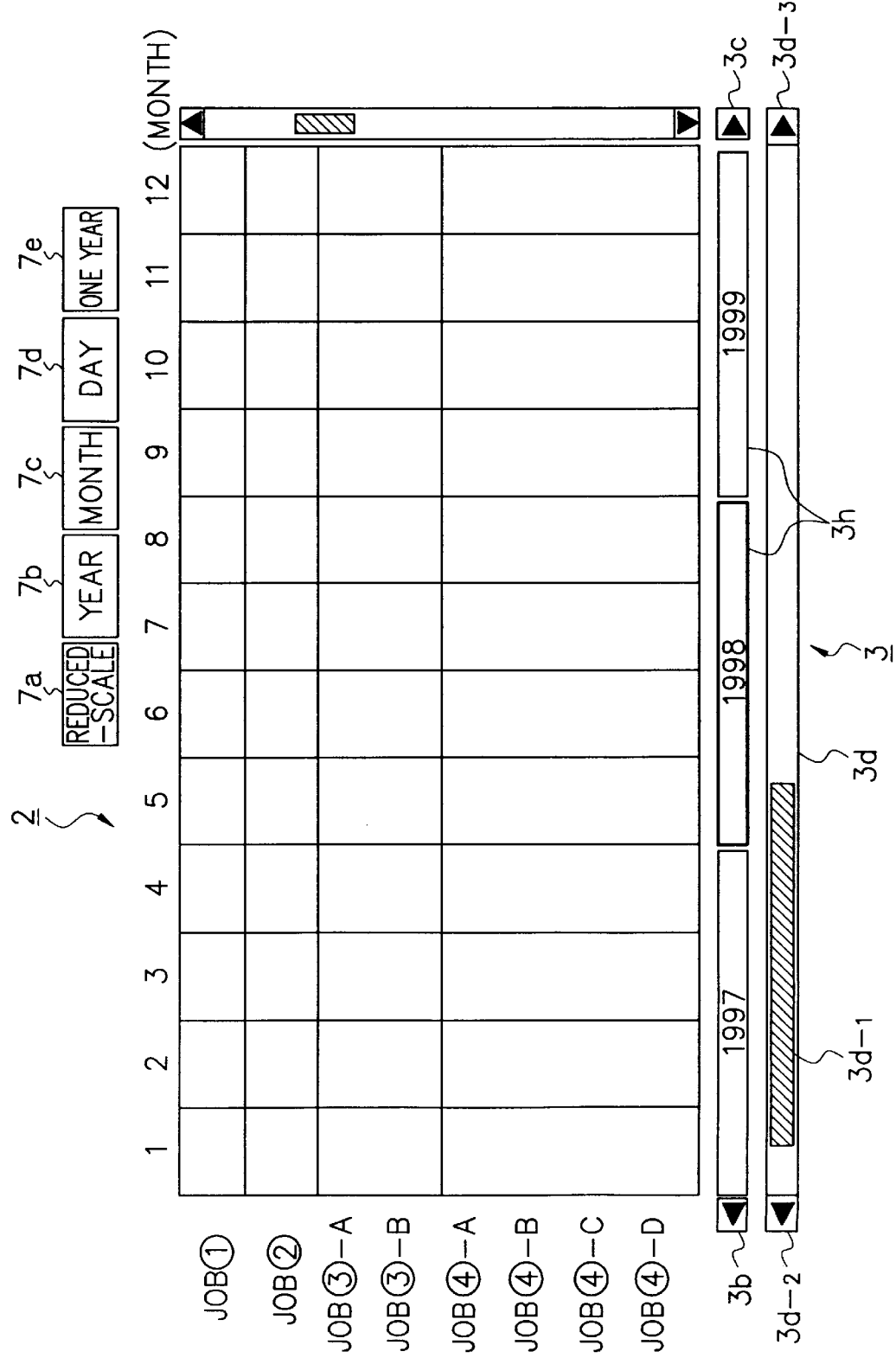
FIG. 6 is a view for explaining a scroll display method on a time axis according to the present invention, and shows a display example on the screen when a year mode and the normal mode have been selected.

Also, in FIG. 6 that shows the display example in the year mode, a plurality of year buttons 3h to each of which one operation member is assigned per year are displayed in place of the day buttons 3a displayed in the day mode. On the other hand, the scroll buttons 3e and 3f which are displayed in the day or month mode are not displayed. Other GUI buttons are the same as those in FIGS. 3 and 4.

Referring back to FIG. 2, reference numeral 4 denotes an information management means for managing schedule information of the Gantt chart displayed on the window 2 in units of, e.g., years, months, and days. Reference numeral 5 denotes a display control means for controlling to display schedule information managed by the information management means 4 on the window 2. Reference numeral 6 denotes a scroll means which controls the display control means 5 to immediately move the screen display field to a data position containing schedule information corresponding to the year, month, and day of the operated button, when a given button of the GUI operation members 3 is operated.

More specifically, when the mode selection means 7 has selected a mode for displaying schedule information for a day in units of days, and the day button 3a for the 14th is clicked on the screen shown in FIG. 3, the scroll means 6 is informed of that operation. The scroll means 6 directs the display control means 5 to move the screen display field to schedule information corresponding to the 14th. In response to this direction, the display control means 5 reads out schedule information for the 14th from the information management means 4, supplies the readout information to the display apparatus, and displays the information on the window 2.

In this embodiment, since the right and left scroll buttons 3c and 3b are also displayed, a display can be gradually updated day by day. For example, when the left scroll button 3b is clicked while schedule information for the 14th is being displayed on the screen in FIG. 3, schedule information corresponding to the 13th is displayed; when the right scroll button 3c is clicked in that state, schedule information corresponding to the 15th is displayed.

When the scroll button 3e or 3f is clicked on the screen, the scroll means 6 is informed of that operation. The scroll means 6 directs to move the screen display field to schedule information for the last or next month on the same day as that currently displayed. In response to this direction, the display control means 5 reads out the corresponding schedule information for the last or next month from the information management means 4, supplies the readout information to the display apparatus, and displays the information on the window 2.

For example, initially, e.g., immediately after the day mode button 7d has been pressed, schedule information of the current month selected upon operation is displayed. At that time, when the day button 3a for the 14th is clicked, schedule information corresponding to the 14th of the current month is read out from the information management means 4, and is displayed on the window 2. Furthermore, when the scroll button 3e is clicked in that state, schedule information corresponding to the 14th of the last month is read out from the information management means 4, and is displayed on the window 2.

When a mode for displaying schedule information for a plurality of days in units of days is selected by the mode selection means 7, the scroll means 6 scrolls to move schedule information for a plurality of days including the day of the operated day button 3a to fall within the screen display field. For example, when the day button 3a for the 14th is clicked on the screen shown in FIG. 4, the scroll means 6 is informed of that operation. Upon reception of this information, the scroll means 6 controls the display control means 5 to move the screen display field to display schedule information for five days including the 14th on the window 2.

In the example in FIG. 4, the plurality of day buttons 3a are divided in units of five days from the left end, and schedule information for each divided unit is displayed on the window 2. According to this example, since the day button 3a for the 14th is included within the unit from the 13th to 17th, schedule information for the 13th to 17th is displayed on the window 2 upon operation of the day button 3a for the 14th. That is, independently of the day buttons 3a for the 13th and 17th to be pressed, the same display state is obtained after scrolling, as shown in FIG. 4.

Note that the display format upon displaying schedule information in units of a plurality of days is not limited to such example shown in FIG. 4. For example, schedule information on the day of the operated day button 3a may always be displayed at the center of the screen of the window 2. In such case, upon operation of the day button 3a for the 14th, schedule information for the 12th to 16th is read out from the information management means 4 and displayed.

When a mode for displaying schedule information for one month in units of months has been selected by the mode selection means 7, if the month button 3g for April is clicked on the screen in FIG. 5, the scroll means 6 is informed of that operation. The scroll means 6 directs the display control means 5 to move the screen display field to schedule information corresponding to "April". In response to this direction, the display control means 5 reads out schedule information for "April", supplies the readout information to the display apparatus, and displays the information on the window 2.

Furthermore, when the scroll button 3e or 3f is clicked in that state, schedule information corresponding to "April" of the last or next year is read out from the information management means 4, and is displayed on the window 2. Upon display in the month mode shown in FIG. 5 as well, initially, e.g., immediately after the month mode button 7c has been operated, schedule information for the current year upon operation is displayed.

When a mode for displaying schedule information for one year in units of years has been selected by the mode selection means 7, if the year button 3h for 1998 is clicked on the screen in FIG. 6, the scroll means 6 is informed of that operation. The scroll means 6 directs the display control means 5 to move the screen display field to schedule information corresponding to "1998". In response to this direction, the display control means 5 reads out schedule information for "1998" from the information management means 4, supplies the readout information to the display apparatus, and displays the information on the window 2.

In this way, according to this embodiment, by operating the day button 3a, month button 3g, year button 3h, or the like, schedule information of the corresponding day, month, or year can be displayed on the window 2. In addition, schedule information can be scrolled by operating a scroll box $3d_{-1}$ or a right or left scroll button $3d_{-3}$ or $3d_{-2}$ that form the scroll bar 3d.

For example, on the display screen in FIG. 3, when the day button 3a for the 14th is clicked, schedule information for one day corresponding to the 14th is displayed on the window 2, as described above. By contrast, when the scroll box $3d_{-1}$ is dragged, schedule information for a certain day can be displayed in the same manner as that upon operation of the day button 3a, and schedule information across two days can also be displayed. More specifically, when the scroll box $3d_{-1}$ is dragged to the central position between, e.g., the 14th and 15th, schedule information for the latter half (e.g., 19:00 to 7:00) of the 14th and schedule information for the former half (e.g., 7:00 to 19:00) of the 15th are displayed in combination on the window 2. Such display can also be attained by slightly moving the scroll box $3d_{-1}$ by clicking the right or left scroll button $3d_{-3}$ or $3d_{-2}$.

Upon creating a certain job schedule, the user must be aware of the fact that the job may be completed within one day or may continue over a plurality of days, or it may start from a late time of a certain day and end at a certain time of the next day. Upon planning or checking a job that takes less than one day, the user need only operate the corresponding day button 3a. However, when a job takes more than one day, the user can easily confirm the start and end times of the job across the days by operating the scroll bar 3d.

When the scroll bar 3d is operated on the display screen in the month mode shown in FIG. 5 or in the year mode shown in FIG. 6, schedule information across two months or years can be displayed on the window 2 by coupling their latter and former halves.

In this manner, schedule information at the boundaries between days, months, or years can be very easily created or checked.

Figure 7:
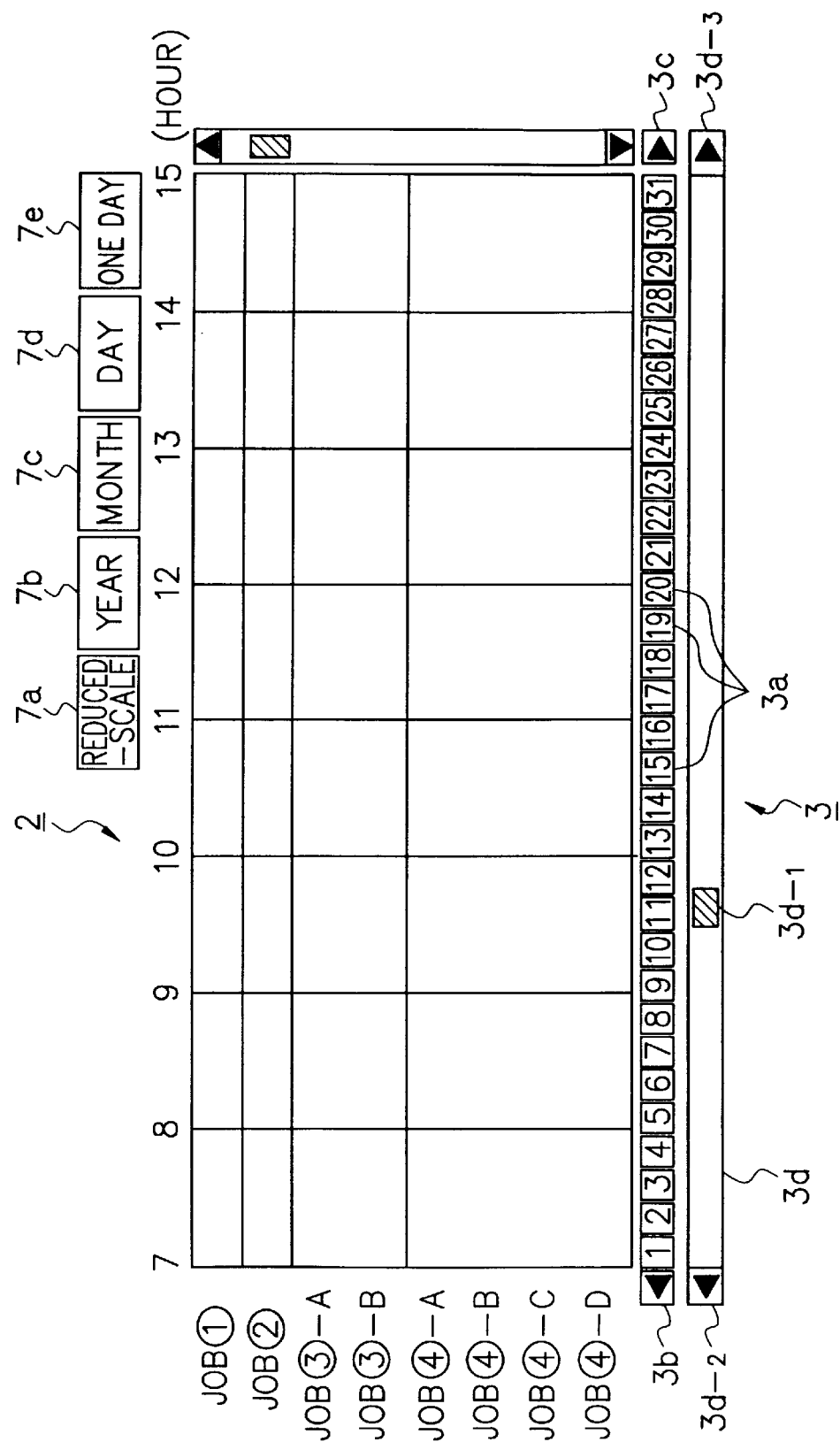
FIG. 7 is a view for explaining a scroll display method on a time axis according to the present invention, and shows another display example on the screen when the day mode and normal mode have been selected.

In the examples in FIGS. 3 and 4, information for 24 hours is displayed as schedule information for a day. Alternatively, as shown in FIG. 7, schedule information for hours shorter than 24 hours may be displayed. In the example shown in FIG. 7, schedule information for eight hours (7:00 to 15:00) is displayed. Depending on the contents of a job to be scheduled, the time zone for the job may be limited in relation to, e.g., the equipment operation time period.

For example, when the operation time period ranges from 7:00 to 15:00, since a job schedule can be planned within that period, schedule information for that period is managed by the information management means 4, and is displayed on the window 2 via the display control means 5. In such case, whether information for 24 hours or several hours shorter than 24 hours is displayed may be switched by automatically checking schedule information managed in the information management means 4 by the display control means 5, or the user may designate it by preparing GUI buttons or menus for that.

The information management means 4, display control means 5, and scroll means 6 shown in FIG. 2 above are implemented by a microcomputer system which comprises a CPU, ROM, RAM, hard disk, and the like (not shown), in practice. The work program of the CPU for attaining the above-mentioned scrolling is stored in, e.g., the ROM. In this case, the ROM that stores the work program constitutes a recording medium of the present invention.

Alternatively, the work program for the CPU may be stored in the hard disk. The work program can be externally supplied to this hard disk. In this case, the hard disk and a means for externally supplying the work program, e.g., a recording medium that stores the work program, constitute a recording medium of the present invention.

As a recording medium that stores the work program, for example, a floppy disk, optical disk, magnetooptical disk, CD-ROM, magnetic tape, nonvolatile memory card, and the like may be used in addition to the above-mentioned ROM and hard disk.

Figure 8:
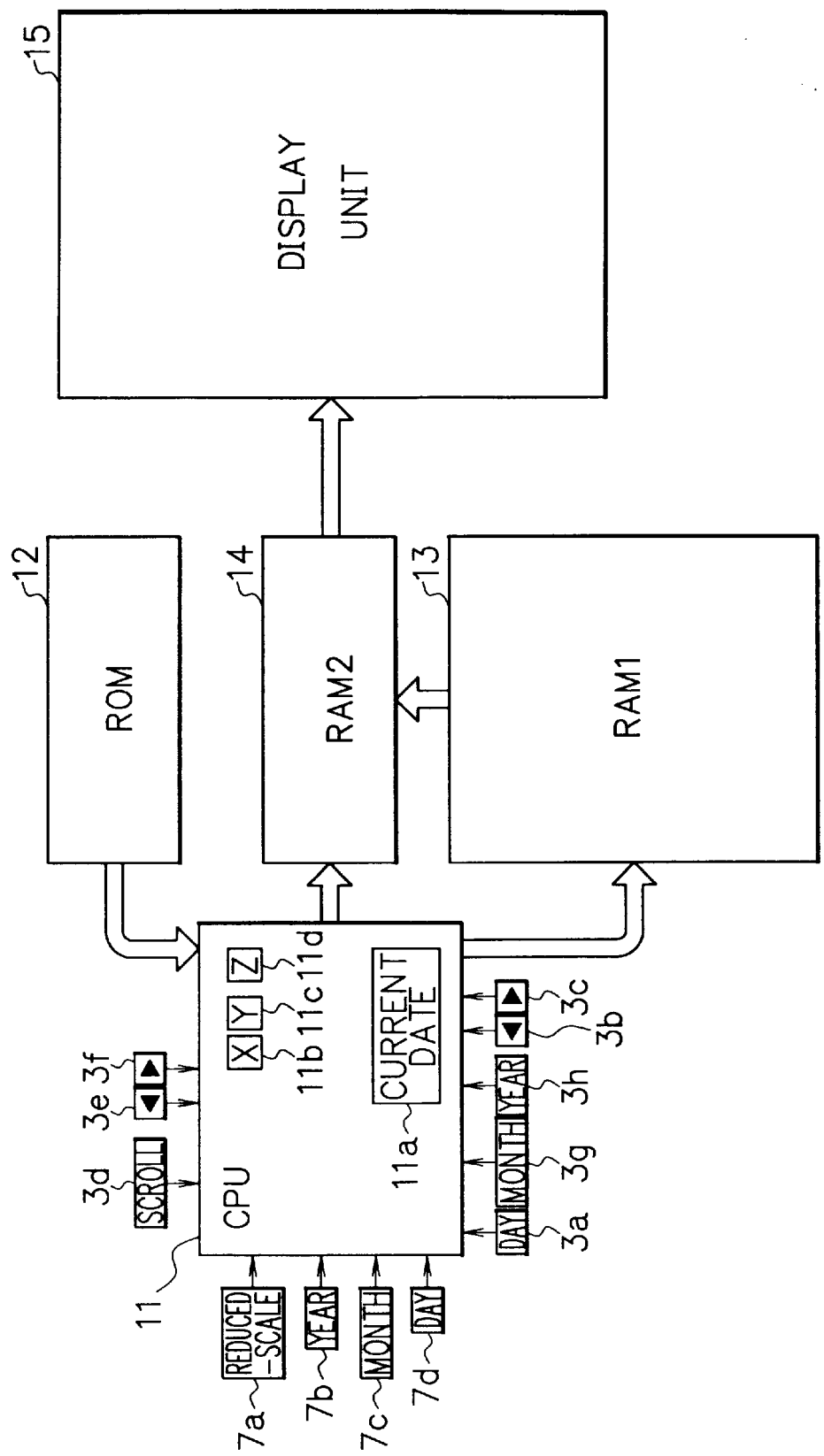
FIG. 8 is a block diagram showing hardware image of a computer which comprises a scroll display control apparatus according to the present invention.

FIG. 8 is a block diagram showing hardware image when the scroll display control apparatus of this embodiment is implemented by the microcomputer system. Note that buttons 3a to 3h, and 7a to 7d illustrated around a CPU 11 in FIG. 8 are GUI operation members displayed on the display screen of a display unit 15 in practice, and are not hardware components in strict sense, but they are illustrated for the purpose of easy understanding.

Referring to FIG. 8, the CPU 11 executes scroll display control described above with the aid of the display screens shown in FIGS. 3 to 7 in accordance with the work program stored in a ROM 12. In the scroll display control, the CPU 11 outputs appropriate addresses to first and second RAMs 13 and 14 to read out schedule information stored in these RAMs 13 and 14 to the display unit 15 in units of days, months, or years.

FIG. 9 is a schematic view showing schedule information stored in the first RAM 13. As shown in FIG. 9, the schedule information is stored in the first RAM 13 in units of years, months, and days. The CPU 11 appropriately controls the address to be output in correspondence with the current display mode selected by one of the mode selection buttons 7a to 7d so as to read out schedule information from the first RAM 13 in units of years, months, or days.

At this time, since the volume of information stored in the first RAM 13 is very large, when the corresponding schedule information is read out to the display unit 15 by designating an appropriate address in the first RAM 13 upon operation of one of the scroll display buttons 3a to 3h, much time is required from that access to read-out, resulting in slow scrolling.

To avoid such problem, in this embodiment, when one of the display modes is selected upon operation of one of the mode selection buttons 7a to 7d, schedule information in an appropriate unit corresponding to the selected display mode is read out from the first RAM 13 to the second RAM 14 in advance. Note that the second RAM 14 has a size much smaller than that of the first RAM 13. For example, the first RAM 13 may be constructed by a large-capacity hard disk or the like, and the second RAM 14 may be constructed by a DRAM or the like.

Upon operation of one of the scroll display buttons 3a to 3h, the CPU 11 detects the day of the month, month, year, or the like of the operated button, and reads out schedule information corresponding to the detected contents from the second RAM 14 to the display unit 15. With this control, when a scroll instruction is actually issued, the corresponding schedule information can be read out from the second RAM 14 with a small size to the display unit 15, thus preventing slow scrolling.

For example, when the day mode is selected upon operation of the day mode button 7d, the CPU 11 outputs an address for reading out schedule information for a month including the current date counted by a current date counter 11a to the first RAM 13 to read out the schedule information for that month to the second RAM 14 in advance. For example, if the date upon setting the day mode is Oct. 2, 1998, schedule information for the month of October in 1998 is read out onto the second RAM 14.

After that, if the day button 3a for the 14th is pressed, as has been described above with reference to FIG. 3, the CPU 11 outputs an address for outputting schedule information for the 14th to the second RAM 14. With this address, schedule information for the 14th of October in 1998 is read out and is supplied to the display unit 15.

In the initial state, the display mode is set in the day mode and normal mode, and schedule information on the current date indicated by the current date counter 11a is displayed on the window of the display unit 15.

Also, as shown in FIG. 8, the CPU 11 comprises X, Y, and Z counters 11b, 11c, and 11d. These counters are used for displaying schedule information in units of a plurality of days, months, or years in the reduced-scale mode.

More specifically, in the examples shown in FIGS. 3 and 4, modes for displaying schedule information for a day or five days are toggled every time the reduced-scale button 7a is pressed. By contrast, in the example shown in FIG. 8, schedule information to be displayed at the same time increases by one day every time the reduced-scale button 7a is pressed. When schedule information for 10 days is displayed by repetitively pressing the reduced-scale button 7a, the display returns to that for one day upon next operation of the reduced-scale button 7a. The same applies to the month and year modes. At this time, the contents of the counters 11b, 11c, and 11d are counted up in correspondence with operation of the reduced-scale button 7a.

Figure 10A:
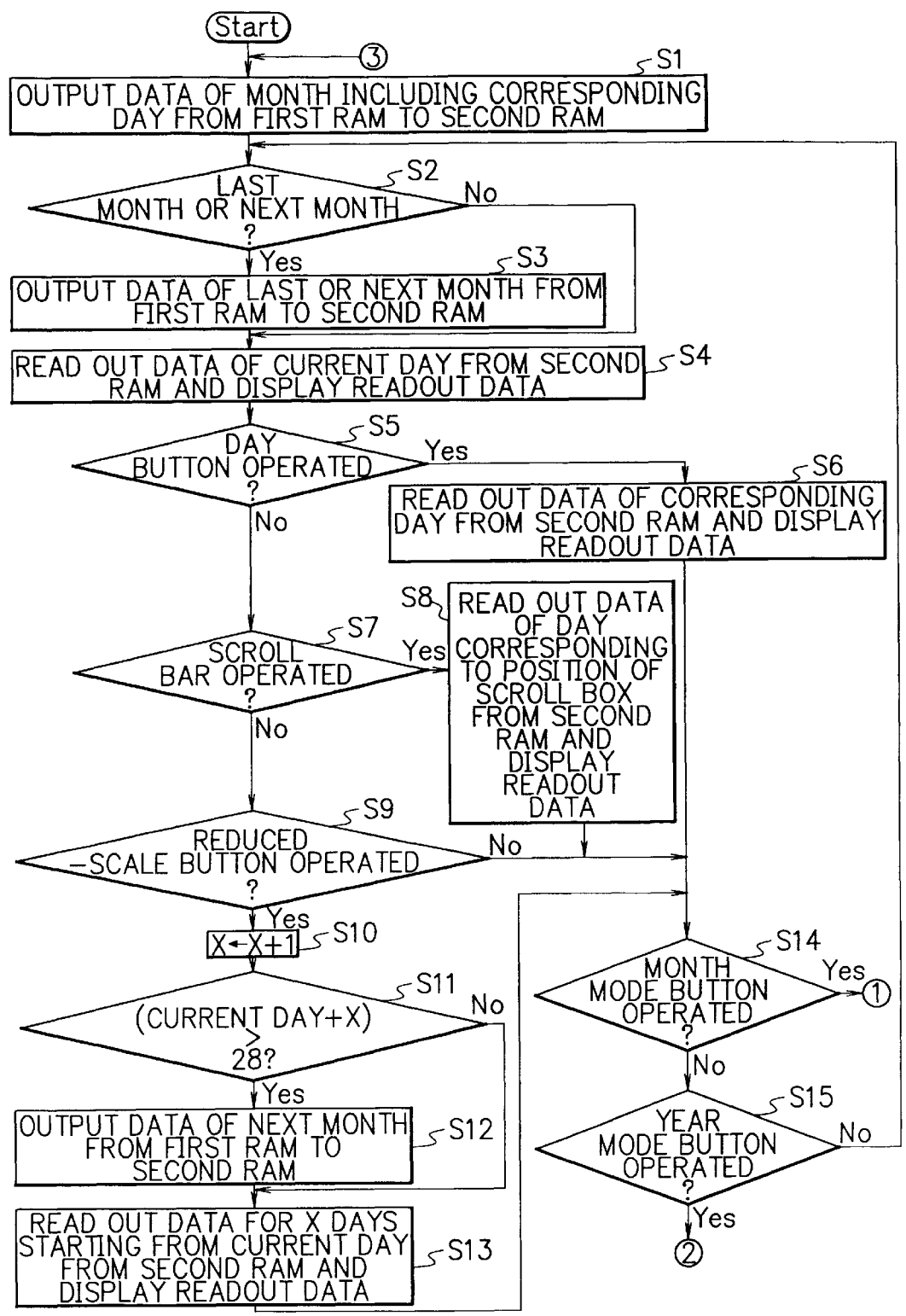

The operation of the scroll display control apparatus according to this embodiment with the arrangement shown in FIG. 8 will be described in detail below with the aid of the flow charts in FIGS. 10A to 10C. The flow chart shown in FIG. 10A starts operation when the power supply of the computer is turned on or an application program is started. In the initial state, since the day mode and normal mode are set, schedule information for one month including the current date indicated by the current date counter 11a is output from the first RAM 13 to the second RAM 14 in step S1.

It is checked in step S2 if the scroll button 3e or 3f has been pressed, i.e., if a display of schedule information for the last or next month is directed. If such button has been operated, schedule information for the last or next month is output from the first RAM 13 to the second RAM 14 in step S3. On the other hand, if the scroll button 3e or 3f is not operated, the control skips step S3, and data loaded onto the second RAM 14 in step S1 is used.

In step S4, schedule information for the current date indicated by the current date counter 11a is read out from the second RAM 14 and is displayed on the display unit 15. If the processing in step S3 has been done, schedule information on the same day in the last or next month is displayed. Furthermore, it is checked in step S5 if any day button 3a has been pressed. If a day button 3a has been operated, schedule information for the day corresponding to the operated button is read out from the second RAM 14, and is displayed on the display unit 15 in step S6.

On the other hand, if none of the day buttons 3a are operated, it is checked in step S7 if the scroll bar 3d has been operated. If the scroll bar 3d has been operated, schedule information for a day corresponding to the position of the moved scroll box $3d_{-1}$ is read out from the second RAM 14 and is displayed on the display unit 15 in step S8. On the other hand, if the scroll bar 3d is not operated, it is checked in step S9 if the reduced-scale button 7a has been operated.

If the reduced-scale button 7a has been operated, the value of the X counter 11b for day of the month is incremented by 1 in step S10, and it is checked in step S11 if the sum of the counter value X and the current day of the month is larger than "28". This number "28" indicates the number of days of February having the smallest number of days in one year. If the sum of the counter value X and the current day of the month exceeds this number of days, it indicates that schedule information for a plurality of days to be displayed is likely to include that for a day or days of the next month.

Normally, in the day mode, the second RAM 14 stores only schedule information for the current month. In such case, schedule information for the next month must be read out from the first RAM 13 to the second RAM 14. For this purpose, if the sum of the counter value X and the current day of the month is larger than "28", the flow advances to step S12 to output schedule information for the next month from the first RAM 13 to the second RAM 14, thereby storing schedule information for two months in the second RAM 14. On the other hand, if the sum is smaller than "28", the control skips the processing in step S12, i.e., jumps to step S13.

In step S13, schedule information for X days indicated by the counter 11$b$ for day of the month starting from the current day of the month indicated by the current date counter 11$a$ is read out from the second RAM 14 and is displayed on the display unit 15. After the processing in step S13, after the processing in step S6 or S8, or after it is determined in step S9 that the reduced-scale button 7$a$ is not operated, the flow advances to steps S14 and S15 to check if the month or year mode button 7$c$ or 7$b$ has been operated. If none of the mode buttons are operated, the flow returns to step S2 to continue the processing in the day mode. If one of these mode buttons has been operated, the flow advances to the processing in FIG. 10B or 10C to execute processing in the month or year mode.

If the month mode button 7$c$ has been pressed, schedule information for a year including the current month indicated by the current date counter 11$a$ is output from the first RAM 13 to the second RAM 14 in step S16 in FIG. 10B. It is then checked in step S17 if the scroll button 3$e$ or 3$f$ has been pressed, i.e., if a display of schedule information for the last or next year has been instructed. If the scroll button 3$e$ or 3$f$ has been operated, the flow advances to step S18 to output schedule information for the last or next year from the first RAM 13 to the second RAM 14.

On the other hand, if neither the scroll button 3$e$ nor 3$f$ is operated, the control skips the processing in step S18, and data loaded onto the second RAM 14 in step S16 is used. In step S19, schedule information for the current month indicated by the current date counter 11$a$ is read out from the second RAM 14 and is displayed on the display unit 15. In this case, if the processing in step S18 has been done, schedule information for the identical month in the last or next year is displayed.

Furthermore, it is checked in step S20 if any month button 3$g$ has been pressed. If one of the month buttons 3$g$ has been pressed, schedule information for a month corresponding to the operated button is read out from the second RAM 14 and is displayed on the display unit 15 in step S21. On the other hand, if none of the month buttons 3$g$ are operated, it is checked in step S22 if the scroll bar 3$d$ has been operated. If the scroll bar 3$d$ has been operated, schedule information for a month corresponding to the position of the moved scroll box 3$d_{-1}$ is read out from the second RAM 14 and is displayed on the display unit 15 in step S23. If the scroll bar 3$d$ is not operated, it is also checked in step S24 if the reduced-scale button 7$a$ has been operated. If the reduced-scale button 7$a$ has been operated, the value of the Y counter 11$c$ for months is incremented by 1 in step S25, and it is checked in step S26 if the sum of the counter value Y and the current month number is larger than "12". This number "12" indicates the number of months included in a year. If the sum of the counter value Y and the current month number exceeds this number of months, it indicates that schedule information for a plurality of months to be displayed include that for a month or months in the next year.

Normally, in the month mode, the second RAM 14 stores only schedule information for the current year. In this case, schedule information for the next year must be read out from the first RAM 13 to the second RAM 14. For this purpose, if the sum of the counter value Y and the current month number is larger than "12", the flow advances to step S27 to output schedule information for the next year from the first RAM 13 to the second RAM 14, thus storing schedule information for two years in the second RAM 14. On the other hand, if the sum is smaller than "12", the control skips the processing in step S27, i.e., jumps to step S28.

In step S28, schedule information for Y months indicated by the counter 11$c$ for the month number starting from the current month indicated by the current date counter 11$a$ is read out from the second RAM 14 and is displayed on the display unit 15. After the processing in step S28, after the processing in step S21 or S23, or after it is determined in step S24 that the reduced-scale button 7$a$ is not operated, the flow advances to steps S29 and S30 to check if the day or year mode button 7$d$ or 7$b$ has been operated. If neither of these mode buttons are operated, the flow returns to step S17 to continue the processing in the month mode. On the other hand, if one of these mode buttons has been operated, the flow advances to the processing shown in FIG. 10A or 10C to execute processing in the day or year mode.

Figure 10C:
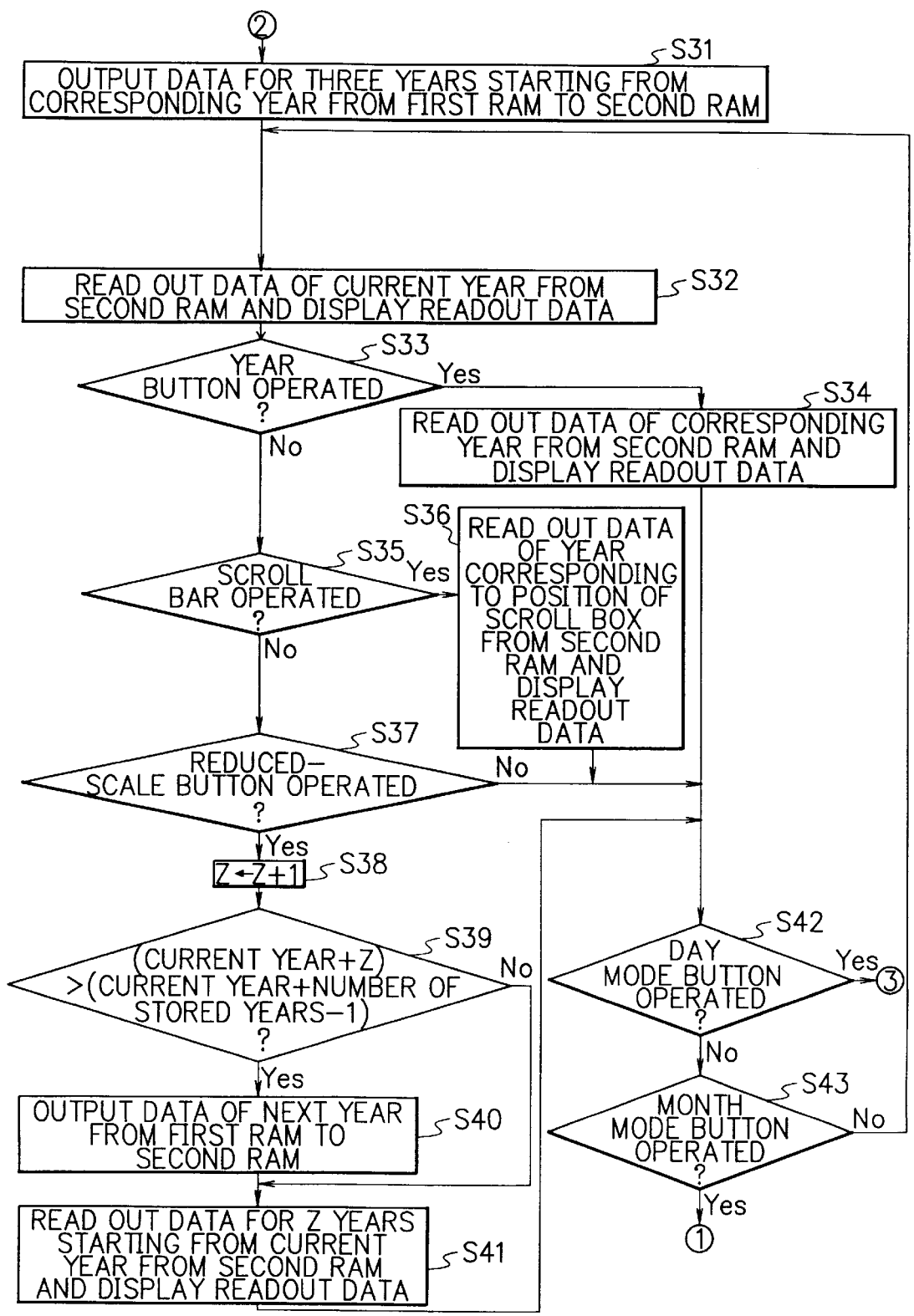

If the year mode button 7$b$ has been pressed, schedule information for a plurality of years (e.g., three years) from the current year indicated by the current date counter 11$a$ is output from the first RAM 13 to the second RAM 14 in step S31 in FIG. 10C. In step S32, schedule information for the current year indicated by the current date counter 11$a$ is read out from the second RAM 14 and is displayed on the display unit 15.

Furthermore, it is checked in step S33 if one of the year buttons 3$h$ has been operated. If one of the year buttons 3$h$ has been operated, schedule information for a year corresponding to the operated button is read out from the second RAM 14 and is displayed on the display unit 15 in step S34. On the other hand, if none of the year buttons 3$h$ are operated, it is checked in step S35 if the scroll bar 3$d$ has been operated. If the scroll bar 3$d$ has been operated, schedule information for a year corresponding to the position of the moved scroll box 3$d_{-1}$ is read out from the second RAM 14 and is displayed on the display unit 15 in step S36. If the scroll bar 3$d$ is not operated, it is then checked in step S37 if the reduced-scale button 7$a$ has been operated.

If the reduced-scale button 7$a$ has been operated, the value of the Z counter 1$1d$ for years is incremented by 1 in step S38, and it is checked in step S39 if the sum of the counter value Z and the current year number is larger than the sum of a value obtained by subtracting 1 from a value indicating the number of years (three years in the initial state) corresponding to the currently stored schedule information, and the current year number. If this condition is satisfied, it indicates that schedule information for a plurality of years to be displayed includes that for a year, which is not stored in the second RAM 14.

In such case, schedule information for that year must be read out from the first RAM 13 to the second RAM 14. The flow then advances to step S40 to output schedule information for that year from the first RAM 13 to the second RAM 14. On the other hand, if the condition is not satisfied in step S39, the control skips the processing in step S40, i.e., jumps to step S41.

In step S41, schedule information for Z years indicated by the counter 11d for years starting from the current year indicated by the current date counter 11a is read out from the second RAM 14 and is displayed on the display unit 15. After the processing in step S41, after the processing in step S34 or S36, or after it is determined in step S37 that the reduced-scale button 7a is not operated, the flow advances to steps S42 and S43 to check if the day or month mode button 7d or 7c has been operated. If neither of these buttons are operated, the flow returns to step S32 to continue the processing in the year mode. On the other hand, if one of these mode buttons has been operated, the flow advances to the processing in FIG. 10A or 10B to execute processing in the day or month mode.

As has been described in detail above, according to this embodiment, when information along the time axis such as a Gantt chart is processed on the computer, since the day, month, and year buttons $3a$, $3g$, and $3h$ are used as means for moving (scrolling) the screen display field along the time axis, the user can very easily see the information as compared to the conventional case using a scroll bar alone, and can quickly observe information of the corresponding part by clicking the day, month, or year button $3a$, $3g$, or $3h$ of a desired day of the month, month, or year in the corresponding display mode.

Since the scroll bar $3d$ is displayed in addition to these day, month, and year buttons $3a$, $3g$, and $3h$, and corresponding schedule information can be displayed by moving the scroll box $3d_{-1}$ to a position between the neighboring buttons, schedule information across two days, months, or years can be displayed by coupling their latter and former halves. In this way, visibility upon generating or checking schedule information at boundaries between days, months, or years can be improved.

In this case, since the day, month, or year buttons $3a$, $3g$, or $3h$ are displayed immediately above the scroll bar $3d$, the scroll box $3d_{-1}$ can be easily moved to a desired date position while observing indications on these buttons. Hence, the user can immediately observe schedule information for a desired day of the month, month, or year even by using the scroll bar $3d$, and operability upon generating or checking schedule information at boundaries between days, months, or years can be improved.

In this embodiment, since the day, month, or year buttons $3a$, $3g$, or $3h$, the scroll bar $3d$, and scroll buttons $3e$ and $3f$ are displayed on the display screen 1 of the computer together with schedule information of a Gantt chart displayed on the window 2, the user need not select another calendar information screen or window that displays these buttons alone to attain scrolling, resulting in easy operation.

In the above embodiment, in the examples shown in FIGS. 3 and 4, the plurality of day buttons $3a$ are lined up from the left to right on the screen beneath the window 2 for displaying information of the screen display field. However, the present invention is not limited to such specific display pattern (the same applies to the month and year buttons $3g$ and $3h$).

The Gantt chart has been exemplified as information to be displayed on the window 2. However, the present invention is not limited to such specific information. That is, any other kinds of information to be displayed along the time axis can be used in addition to schedule information in other patterns.

In the above embodiment, as a mode for displaying schedule information on the window 2, for example, the day mode includes the mode for displaying information in units of days (FIG. 3) and the mode for displaying information in units of five days (FIG. 4). Also, information may be displayed in other units. For example, information may be displayed in units of shifts or half days. In the month and year modes as well, schedule information may be displayed in various units.

When information is to be displayed in units of half days, the right and left scroll buttons $3d_{-3}$ and $3d_{-2}$ can be used as effective means for scrolling. More specifically, when scrolling of schedule information for half a day is implemented by day buttons alone, the number of day buttons becomes large (that is, the number of day buttons doubles if buttons are displayed in units of half days). By contrast, when GUI operation members for scrolling use only the day buttons $3a$ shown in FIG. 3, and the former and latter halves in a day are shifted using the right and left scroll buttons $3d_{-3}$, and $3d_{-2}$, the number of day buttons $3a$ need be increased.

What is claimed is:

1. A scroll display method for showing the relation in time between a plurality of jobs which are displayed on a screen, in a Gantt chart of a bar graph on a time axis, and moving a screen display field of said Gantt chart along the time axis, said method comprising the steps of:

displaying a plurality of GUI operation members on the screen together with said Gantt chart, said operation members being a plurality of buttons respectively assigned to specific time ranges on said time axis and on which calendar information of the assigned time ranges is displayed; and moving the screen display field along the time axis to display at least the portion of said Gantt chart corresponding to a date indicated by the operated GUI operation member on which said calendar information is displayed on the screen upon operation of one of said GUI operation members.

2. A method according to claim 1, wherein said GUI operation members are a plurality of day buttons each of which is assigned to one day specific on said time axis and on which the assigned day is displayed.

3. A method according to claim 1, wherein said GUI operation members are a plurality of month buttons each of which is assigned to one month specific on said time axis and on which the assigned month is displayed.

4. A method according to claim 1, wherein said GUI operation members are a plurality of year buttons each of which is assigned to one year specific on said time axis and on which the assigned year is displayed.

5. A method according to claim 1, wherein the contents of said Gantt chart displayed on the screen display field give schedule information for scheduling, said method has a mode for displaying the schedule information in units of days, a mode for displaying the schedule information in units of months, and a mode for displaying the schedule information in units of years, and said GUI operation members are switched to a plurality of day buttons each of which is assigned to one day, a plurality of month buttons each of which is assigned to one month, or a plurality of year buttons each of which is assigned to one year in correspondence with one of the modes selected.

6. A method according to claim 5, wherein the modes are switched by mode selection means.

7. A method according to claim 1, wherein the contents of said Gantt chart displayed on the screen display field give time information for scheduling, said method has a mode for displaying one unit schedule of the time information, and a mode for simultaneously displaying a plurality of unit schedules, and when the mode for simultaneously displaying the plurality of unit schedules is selected, scrolling is made to move and display a plurality of unit schedules of the time information including a date indicated by the operated GUI operation within the screen display field.

8. A method according to claim 7, wherein the modes are switched by mode switching means.

9. A method according to clam 1, wherein a GUI operation member consisting of a scroll bar of GUI operation members, on which said calendar information is displayed, is displayed, and when the scroll bar is operated and a scroll box that forms said scroll bar is moved to an arbitrary position, wherein the screen display field is moved along the time axis to display the portion of said Gantt chart for a date corresponding to the arbitrary position of the scroll box.

10. A scroll display control apparatus for showing the relation in time between a plurality of jobs which are displayed on a screen, in a Gantt chart of a bar graph on a time axis, and moving a screen display field of said Gantt chart along the time axis, comprising:

a plurality of GUI operation members on the screen together with said Gantt chart, said operation members being a plurality of buttons respectively assigned to specific time ranges on said time axis and on which calendar information of the assigned time ranges is displayed; and scroll means for moving the screen display field along the time axis to display at least the portion of said Gantt chart corresponding to a date indicated by the operated GUI operation member on which said calendar information is displayed on the screen upon operation of one of said GUI operation members.

11. An apparatus according to claim 10, wherein said GUI operation members are a plurality of day buttons each of which is assigned to one day specific on said time axis and on which the assigned day is displayed.

12. An apparatus according to claim 10, wherein said GUI operation members are a plurality of month buttons each of which is assigned to one month specific on said time axis and on which the assigned month is displayed.

13. An apparatus according to clam 10, wherein said GUI operation members are a plurality of year buttons each of which is assigned to one year specific on said time axis and on which the assigned year is displayed.

14. An apparatus according to claim 10, wherein the contents of said Gantt chart displayed on the screen display field give schedule information for scheduling, and said apparatus further comprises:

mode selection means for selecting one of a mode for displaying the schedule information in units of days, a mode for displaying the schedule information in units of months, and a mode for displaying the schedule information in units of years; and GUI switching means for switching said GUI operation members to a plurality of day buttons each of which is assigned to one day, a plurality of month buttons each of which is assigned to one month, or a plurality of year buttons each of which is assigned to one year in correspondence with one of the modes selected.

15. An apparatus according to claim 10, wherein the contents of said Gantt chart displayed on the screen display field give time information for scheduling, said apparatus further comprises mode selection means for selecting one of a mode for displaying one unit schedule of the time information, and a mode for simultaneously displaying a plurality of unit schedules, and when the mode for simultaneously displaying the plurality of unit schedules is selected, said scroll means scrolls to move and display a plurality of unit schedules of the time information including a date indicated by the operated GUI operation member within the screen display field.

16. An apparatus according to claim 14, wherein a scroll button is used together with said day, month, or year buttons.

17. An apparatus according to claim 14, wherein a GUI operation member consisting of a scroll bar of GUI operation members, on which said calendar information is displayed, is displayed, and wherein when the scroll bar is operated and a scroll box that forms said scroll bar is moved to an arbitrary position, said scroll means moves the screen display field along the time axis to display the portion of said Gantt chart for a date corresponding to the arbitrary position of the scroll box.

18. An apparatus according to claim 14, further comprising:

first storage means for storing schedule information in units of years, months, and days for scheduling;

second storage means for storing some pieces of schedule information read out from said first storage means; and read-out control means for, upon switching the modes, controlling to store some pieces of schedule information required for the selected mode from said storage means to said second storage means, and wherein when one of said GUI operation members is operated, said scroll means reads out the portion of said Gantt chart corresponding to a date indicated by the operated GUI operation member from said second storage means and displays the readout information on the screen.

19. A computer-readable storage medium recording a program for making a computer implement a function of showing the relation in time between a plurality of jobs in a Gantt chart of a bar graph on a time axis, and displaying GUI operation members on the screen together with said Gantt chart, said operation members being a plurality of buttons respectively assigned to specific time ranges on said time axis and on which calendar information of the assigned time ranges is displayed, together with said Gantt chart on a screen which can be scrolled to move a screen display field of said Gantt chart along the time axis, and moving the screen display field along the time axis to display at least the portion of said Gantt chart corresponding to a date indicated by the operated GUI operation member on which said calendar information is displayed on the screen upon operation of one of said GUI operation members.

20. A medium according to claim 19, wherein said GUI operation members are a plurality of day buttons each of which is assigned to one day specific on said time axis and on which the assigned day is displayed.

21. A medium according to claim 19, wherein said GUI operation members are a plurality of month buttons each of which is assigned to one month specific on said time axis and on which the assigned month is displayed.

22. A medium according to claim 19, wherein said GUI operation members are a plurality of year buttons each of which is assigned to one year specific on said time axis and on which the assigned year is displayed.

23. A medium according to claim 19, wherein the contents of said Gantt chart displayed on the screen display field give schedule information for scheduling, and said medium further records a program for making the computer implement a function, which as made selection means for selection one of a mode for displaying the schedule information in units of days, a mode for displaying the schedule information in units of months, and a mode for displaying the schedule information in units of years, and which switches said GUI operation members to a plurality of day buttons each of which is assigned to one day, a plurality of month buttons each of which is assigned to one month, or a plurality of year buttons each of which is assigned to one year in correspondence with one of the modes selected.

24. A medium according to claim 19, further recording a program for making the computer implement a function of displaying a GUI operation member consisting of a scroll bar of GUI operation members, on which said calendar information is displayed, and moving the screen display field along the time axis to display information of a date corresponding to an arbitrary position of a scroll box that forms the scroll bar on the screen upon operation of the scroll bar.

* * * * *

UNITED STATES PATENT AND TRADEMARK OFFICE
CERTIFICATE OF CORRECTION

PATENT NO. : 6,380,953 B1 Page 1 of 1
DATED : April 30, 2002
INVENTOR(S) : Shinya Mizuno It is certified that error appears in the above-identified patent and that said Letters Patent is hereby corrected as shown below:

<u>Title page,</u>
Item [73], change Assignee "Nippon Steel Corporation, Tokyo (JP)" to
-- NS Solutions Corporation, Tokyo (JP) --

Signed and Sealed this

Second Day of July, 2002

Attest:

Attesting Officer

JAMES E. ROGAN
*Director of the United States Patent and Trademark Office*